(12) United States Patent
Husband

(10) Patent No.: US 11,066,178 B2
(45) Date of Patent: Jul. 20, 2021

(54) LINK FOR AIRCRAFT COMPONENT MOUNTING

(71) Applicant: United Technologies Corporation, Hartford, CT (US)

(72) Inventor: Jason Husband, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1224 days.

(21) Appl. No.: 14/842,907

(22) Filed: Sep. 2, 2015

(65) Prior Publication Data

US 2017/0057651 A1 Mar. 2, 2017

(51) Int. Cl.
*B64D 27/26* (2006.01)
*B64D 27/12* (2006.01)
*B64D 27/14* (2006.01)

(52) U.S. Cl.
CPC ............. *B64D 27/26* (2013.01); *B64D 27/12* (2013.01); *B64D 27/14* (2013.01); *B64D 2027/262* (2013.01); *B64D 2027/266* (2013.01)

(58) Field of Classification Search
CPC .. B64D 27/26; B64D 27/2027; B64D 27/262; B64D 27/266; B64D 27/268; B64D 27/12; B64D 27/14; B64C 3/44; B64C 3/48; B64C 3/52; B64C 2003/445; F02C 7/20; F05D 2240/90; F05D 2240/91; Y10T 403/45; Y10T 403/453; Y10T 403/454; Y10T 403/54
See application file for complete search history.

(56) References Cited

U.S. PATENT DOCUMENTS

| 1,772,414 | A | * | 8/1930 | Brooke-Hunt | .......... F16F 1/371 267/141.1 |
| 2,377,006 | A | | 5/1945 | Heinemann et al. | |
| 2,565,733 | A | | 8/1951 | Korsberg | |
| 2,708,131 | A | * | 5/1955 | Herbert | ...................... B62J 7/08 403/291 |
| 2,720,370 | A | | 10/1955 | Hasbrouck | |
| 3,328,229 | A | * | 6/1967 | Windecker | .............. B29C 70/86 156/177 |
| 4,704,918 | A | * | 11/1987 | Orkin | ....................... D04C 3/48 403/224 |

(Continued)

FOREIGN PATENT DOCUMENTS

DE 102010010712 9/2011
FR 2965867 4/2012

(Continued)

OTHER PUBLICATIONS

FR 2965867—English machine translation.*

(Continued)

*Primary Examiner* — Tien Q Dinh
(74) *Attorney, Agent, or Firm* — Carlson, Gaskey & Olds, P.C.

(57) ABSTRACT

A gas turbine engine mount for an aircraft wing including a link body having a first joint, a second joint and a linking structure connecting the first joint to the second joint. The linking structure includes at least a flexing portion and an elastic portion. The flexing portion is configured to flex during a load outside of an expected load window.

20 Claims, 5 Drawing Sheets

(56) References Cited

U.S. PATENT DOCUMENTS

| | | | | |
|---|---|---|---|---|
| 5,303,880 | A | * | 4/1994 | Cencula ............... B64D 27/26 244/54 |
| 5,351,930 | A | * | 10/1994 | Gwinn ................. B64D 27/26 244/54 |
| 5,782,078 | A | * | 7/1998 | Brantley ............... F16B 7/06 248/555 |
| 6,298,962 | B1 | | 10/2001 | Kato et al. |
| 6,330,985 | B1 | | 12/2001 | Manteiga et al. |
| 6,607,165 | B1 | | 8/2003 | Manteiga et al. |
| 6,843,449 | B1 | | 1/2005 | Manteiga et al. |
| 8,322,651 | B2 | | 12/2012 | Levert et al. |
| 9,611,046 | B1 | * | 4/2017 | Takeuchi ............... B64D 27/18 |
| 2002/0180129 | A1 | * | 12/2002 | Frobisher ............... F16F 13/107 267/140.11 |
| 2005/0140073 | A1 | * | 6/2005 | Costello ............... E05F 1/1075 267/73 |
| 2006/0045650 | A1 | * | 3/2006 | Donovan ............... F16B 19/05 411/106 |
| 2007/0125087 | A1 | * | 6/2007 | Callaghan ............. F01D 21/045 60/772 |
| 2012/0018576 | A1 | | 1/2012 | Bonnet et al. |
| 2012/0110821 | A1 | | 5/2012 | Callaghan |
| 2012/0119056 | A1 | * | 5/2012 | Dunleavy ............. B64D 27/26 248/554 |
| 2013/0099051 | A1 | * | 4/2013 | Bellabal ................ B64D 27/26 244/54 |
| 2014/0000999 | A1 | | 1/2014 | Boulet et al. |
| 2014/0183297 | A1 | | 7/2014 | Brochard et al. |
| 2016/0083101 | A1 | * | 3/2016 | Ronski ..................... F16F 9/10 60/783 |

FOREIGN PATENT DOCUMENTS

| | | | | |
|---|---|---|---|---|
| GB | 2074289 A | * | 10/1981 | ............ B64D 27/26 |
| WO | 2008150202 | | 12/2008 | |

OTHER PUBLICATIONS

Google.com, "define connect"; https://www.google.com/search?q=define+connect; accessed Apr. 26, 2018 (Year: 2018).*
European Search Report for Application No. 16187133.0 completed on Jan. 26, 2017.

* cited by examiner

LINK FOR AIRCRAFT COMPONENT MOUNTING

TECHNICAL FIELD

The present disclosure relates generally to mounts for aircraft components, and specifically to a link for mounting an aircraft component, to a wing or body of an aircraft.

BACKGROUND

Typical aircraft, such as those utilized in commercial and military applications, include multiple components mounted to an underside of a wing or body of the aircraft. Each of the components is connected to the underside of the corresponding wing or body via one or more links and mounts. In existing systems, the links are stiff (designed elastically) and transfer approximately 100% of the load from the mounted component to the mount.

During normal operations and maneuvers of the aircraft, the effective weight of the mounted component can increase, resulting in an increased load being applied to the aircraft wing or body. A rotor blade sheering off within an engine, which is one type of high load event, generates a significant additional load on the link as a result of the centrifugal force applied by the event. Such events are referred to as blade off events.

Links used for this purpose are designed such that they can elastically withstand an increased load in excess of the maximum expected load, including the maximum expected load from a blade off event without deforming.

SUMMARY OF THE INVENTION

In one exemplary embodiment an aircraft component link includes a link body having a first joint, a second joint, and a linking structure connecting the first joint to the second joint. The linking structure including at least a first portion and a second portion, the second portion being rigid relative to the first portion.

In another exemplary embodiment of the above described aircraft component link, the first portion is configured to flex in response to a load greater than a first threshold and elastically deform to loads under the first threshold.

In another exemplary embodiment of any of the above described aircraft component links, the first threshold is at least partially based on a maximum expected load magnification during standard in flight operations of an aircraft.

In another exemplary embodiment of any of the above described aircraft component links, the first portion is configured to inelastically deform when exposed to loads greater than a first threshold.

In another exemplary embodiment of any of the above described aircraft component links, the first threshold is at least partially based on a maximum expected load magnification during standard in flight operations of an aircraft.

In another exemplary embodiment of any of the above described aircraft component links, the first portion is configured to elastically deform when exposed to loads less than or equal to the first threshold.

In another exemplary embodiment of any of the above described aircraft component links, the first portion is configured to withstand inelastic deformation at least a predetermined number of times and the predetermined number of times is less than an expected number of push-pull cycles during a high load event.

In another exemplary embodiment of any of the above described aircraft component links, the linking structure comprises at least two first portions and at least two second portions.

Another exemplary embodiment of any of the above described aircraft component links further includes a secondary linking structure connecting the first joint to the second joint.

In another exemplary embodiment of any of the above described aircraft component links, a load of a mounted component is carried by the secondary link when the linking structure is in a failed state.

In another exemplary embodiment of any of the above described aircraft component links, the secondary link comprises a flexible strap.

In another exemplary embodiment of any of the above described aircraft component links, the flexible strap is at least partially a para-aramid synthetic fiber such as KEVLAR®.

In another exemplary embodiment of any of the above described aircraft component links, the first joint is connected to a gas turbine engine, and wherein the second joint is connected to a mount, the mount being connected to one of an aircraft wing and an aircraft body.

An exemplary method for preventing transference of high loads to an aircraft wing or body during a high load event includes inelastically deforming at least a portion of an aircraft component link, wherein the aircraft component link is linking an aircraft component to one of a wing and a body of the aircraft.

A further example of the above described exemplary method includes inelastically deforming at least a portion of an aircraft component link by inelastically deforming the at least a portion of the aircraft link in response to load magnification peaks and valleys outside of an expected load magnification window, and elastically deforming of the at least a portion of the aircraft link in response to load magnification peaks and valleys inside of the expected load magnification window.

A further example of any of the above described exemplary methods further includes replacing the aircraft component link after inelastically deforming at least a portion of an aircraft component link and prior to a subsequent high load event.

In one exemplary embodiment a gas turbine engine mount for an aircraft wing includes a link body having a first joint, a second joint and a linking structure connecting the first joint to the second joint. The linking structure including at least a flexing portion and an elastic portion, the flexing portion being configured to flex during a load outside of an expected load window.

In another exemplary embodiment of the above described gas turbine engine mount, the flexing of the flexing portion is an inelastic deformation of the flexing portion of the linking structure.

In another exemplary embodiment of any of the above described gas turbine engine mounts, the flexing portion is configured to elastically deform during a load inside of the expected load window.

In another exemplary embodiment of any of the above described gas turbine engine mounts, the rigid portion is rigid relative to the flexing portion, and maintains rigidity during all loads.

These and other features of the present invention can be best understood from the following specification and drawings, the following of which is a brief description.

DETAILED DESCRIPTION OF AN EMBODIMENT

Figure 1:
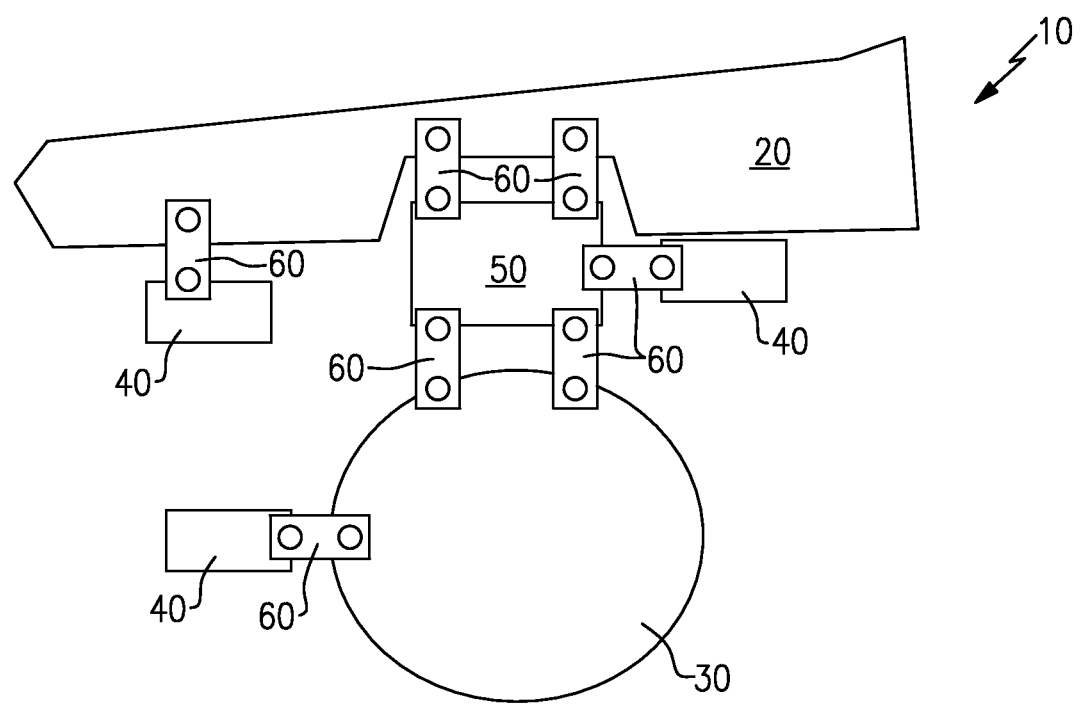
FIG. 1 schematically illustrates an aircraft wing supporting multiple aircraft components.

FIG. 1 schematically illustrates a wing assembly 10 for an aircraft. The wing assembly 10 includes a wing 20, a gas turbine engine 30 mounted below the wing 20, and multiple additional components 40 mounted below the wing 20 or to the engine 30. The gas turbine engine 30 is mounted to wing mounts 50 (such as an engine pylon) via one or more links 60.

In the illustrated aircraft, the engine 30 has a known weight. By way of example the engine could weigh approximately 10,000 lbs (4535.9 kgs). A weight of 10,000 lbs (4535.9 kgs) is utilized for illustrative purposes only. The actual weight of any given engine, or other mounted component, varies depending on the specific engine type, aircraft type, and component configuration. While the aircraft is not operating, the engine imparts a load equal to the weight of the engine 30 across each of its links 60. The links 60 transmit the load through the mounts 50 into the wing 20. During normal in flight maneuvers, the load seen by the link 60, and imparted to the wing 20 through the mounts 50, can vary due to turbulence, ascent, decent, or any other number of factors. These factors can increase the load placed on the links 60 and the mounts 50. In one example the amount that the load is increased during standard maneuvers is increased by up to a factor of five. More specifically, in the example, the load transmitted to the wing 20 through the link 60 and connected to the engine 30 is approximately five times the weight of the engine 30.

During high load events, such as a blade off event, the load seen by the links 60 can increase significantly beyond the expected load from standard in flight maneuvers. In existing systems, the links 60 are designed to elastically withstand the increased load of a blade off event or other high load event. In one example, the blade off event can cause loads to be transmitted through the link 60 that are approximately twelve times the engine weight. While specific numerical values are used herein for explanatory purposes, one of skill in the art having the benefit of this disclosure will understand that the actual magnification of the load resulting from blade off events, other high load events, and from standard maneuvers will vary depending on the specific aircraft and the specific mounted component.

Further, one of skill in the art will understand that a blade off event is an exemplary situation in which the magnitude of the load transmitted through each of the links 60 and the mounts 50 to the wing 20 is substantially increased. Additional, or alternative, high load events can occur that have a similar effect on the transmitted load, and are accounted for in the same manner.

Figure 2:
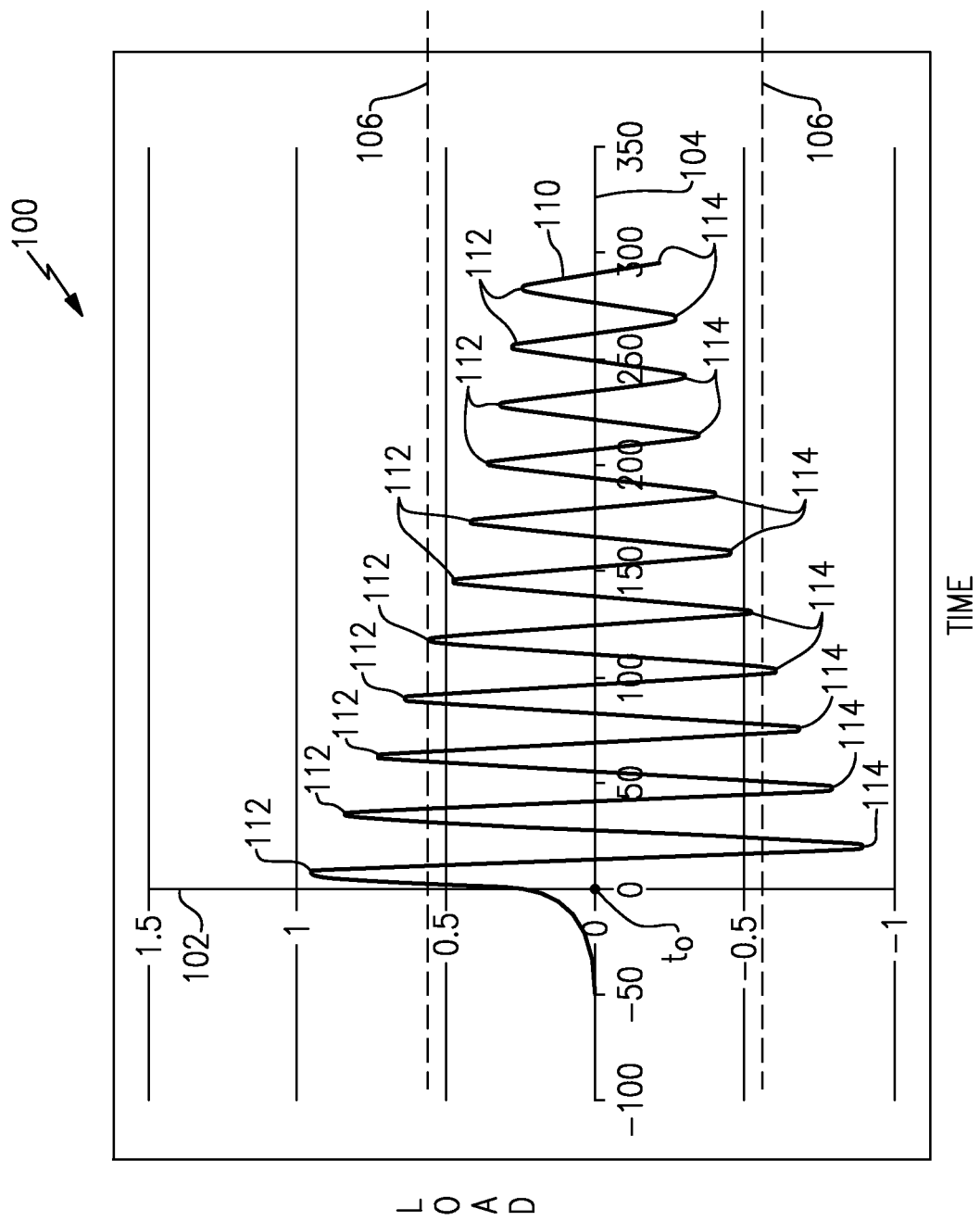
FIG. 2 illustrates a normalized chart of an expected load during a blade off event.

With continued reference to FIG. 1, FIG. 2 illustrates a load versus time chart 100 during an exemplary high load event, such as a blade off event. The magnitude of a load 110, seen by the link 60, is normalized relative to a load axis 102 (the vertical axis). At time t0 on a time axis 104, a blade in the engine 30 sheers off, causing the blade off event. When the blade shears off within the engine 30, the unbalanced rotational motion imparts a centrifugal force on the engine 30. Almost immediately after the blade off event occurs, the load 110 transmitted through the link 60 to the mount 50 and the wing 20 spikes to a maximum value at a first peak 112.

From the first peak 112, the load decreases to a minimum at a first valley 114. The peaks 112 and valleys 114 decay over time, resulting in an ever decreasing impact on the load seen by the link 60. An expected load increase from standard in flight maneuvers is illustrated by a dashed line 106. Once the peaks 112 and valleys 114 have decreased to be within the dashed lines 106, loads from the standard maneuvers overtake the oscillations from the blade off event, and the blade off event has minimal impact on the load experienced by the links 60.

In one practical example, the peaks 112 and valleys 114 are separated on the order of milliseconds (ms), and the load increase decays to be within the dashed lines 106 in less than a second.

Figure 3:
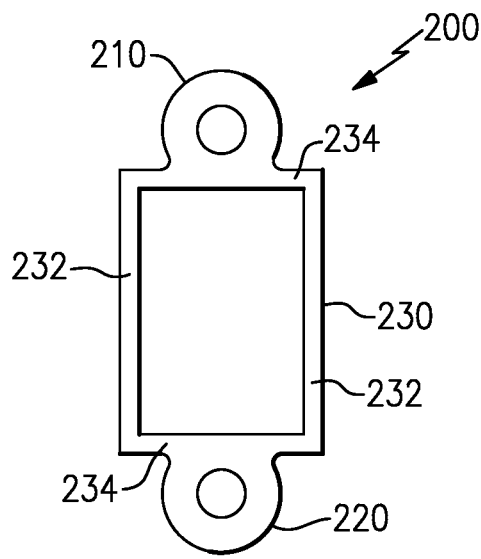
FIG. 3 schematically illustrates an exemplary link according to one example.

With continued reference to FIGS. 1 and 2, FIG. 3 illustrates a first example link 200 for connecting a component, such as an engine, to a wing or body of an aircraft. The link 200 includes a first joint 210 and a second joint 220. The first joint 210 connects to a mount 50 (illustrated in FIG. 1), such as an engine pylon. The second joint 220 connects to the mounted component, such as the engine 30. In alternative examples, the mounted component can be any other component mounted to the wing or body of the aircraft. Further, in some examples, multiple links 200 can be utilized to connect a single component to a given mount 50.

Connecting the first joint 210 and the second joint 220 is a linking structure 230. The illustrated linking structure 230 of FIG. 3 includes two rigid portions 232 and two flexing portions 234. The rigid portions 232 are rigid during all modes of aircraft operation. The flexing portions 234 flex when the load seen by the link 200 exceeds a pre-determined amount. In the illustrated example of FIGS. 2 and 3, the pre-determined amount is any load that is outside of the dashed lines 106. As such, the flexing portions 234 remain rigid during the standard operations and flex during a high load event. The rigid portions 232 are rigid relative to the flexing portions 234.

When a load in excess of the predetermined amount is experienced, the flexing portions 234 flex with the peaks 112 and valleys 114 of the load, and reduce the magnitude of the load transferred through the link 200 and seen by the wing or body of the aircraft. In one example, the flexing of the flexing portion 234 is an inelastic deformation of the link 200.

One of skill in the art will understand that an inelastic deformation reduces the structural integrity of the link 200. After a certain number of flexes, or push-pull cycles, the structural integrity of the link 200 is reduced to a point that the link 200 can break. This breakage is referred to as a fracture and is a result of low cycle fatigue. The number of flexes that occur within a given high load event, such as a blade off event, is less than the number of flexes before the structural integrity of the link 200 is reduced to near breaking. As such, the link 200 can withstand a high load event before breaking or being replaced.

By way of example, the inelastic flexing portion 234 is, in one example, designed to withstand flexing up to seven times before breaking. A blade off, or similar event, will only have four peak valley pairings (push-pull cycles) outside of the dashed lines 106 (See FIG. 2). In such an example, the link 200 is capable of withstanding one blade off, or other high load event, and maintaining the link between the mounted component and the mount. Once such an even has occurred, the aircraft can safely land and replace the link.

During operation, the flexing of the flexing portions 234 acts as a buffer and absorbs a portion of the increased load that would be transmitted to the wing or aircraft body in existing links. In one example, the flexing portion 234 is configured to limit the load increase during a blade off, or similar, event to seven times the component weight. In contrast, a purely rigid link elastically deforming would transmit upwards of twelve times the component weight.

Figure 4A:
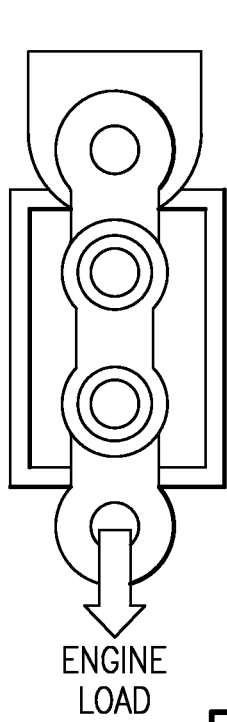
FIG. 4a schematically illustrates the exemplary link according to the example of FIG. 3 during a period of increased load.
Figure 4B:
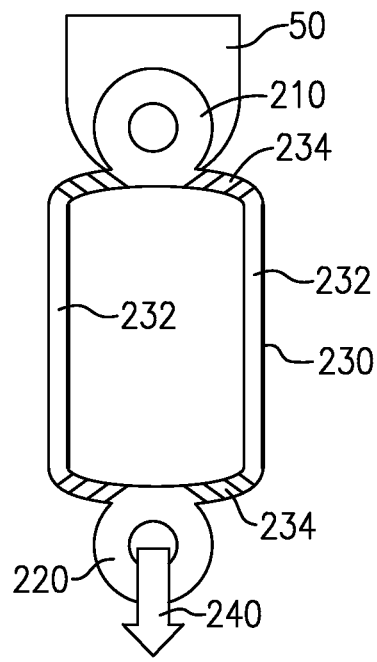
FIG. 4b schematically illustrates the exemplary link according to the example of FIG. 3 during a period of decreased load.

With continued reference to FIG. 3, and with like numerals indicating like elements, FIGS. 4a and 4b illustrate the link 200 during a peak load (pull) of a blade off event (FIG. 4a) and during a valley loading (push) of a blade off event (FIG. 4b).

During the initial blade off event, and at each load peak 112, an increased load is applied away from the mount 50, in the direction of load arrow 240. The increased load causes the flexing portions 234 to inelastically deform, thereby absorbing a portion of the load increase. During each of the valleys 114, the flexing portions 234 inelastically deforms in the opposite direction. The oscillation between peaks 112 and valleys 114 results in an oscillating inelastic deformation of the flexing portion 234. As described above, once the magnitude of the load increases at the peaks 112 and valleys 114 falls within a configured load window (inside the dashed lines 106), the flexing portions 234 respond to the load increases elastically, thereby transferring the full load increase to the mount 50 and the corresponding aircraft wing or body.

With continued reference to FIGS. 1-4b, FIG. 5 illustrates the exemplary link 200 of FIG. 3 with an additional backup feature. The backup feature provides a secondary link 300 that maintains a connection between the mount 50 (illustrated in FIGS. 4a and 4b) and the engine 30, or other mounted component, in the case of a failure of the primary link 200. The secondary link 300 includes a link strap 310 having a mount side connector 320 and a component side connector 330. The mount side connector 320 and the component side connector 330 are connected via a strap portion 340. In order to facilitate the inclusion of the secondary link 300, the link 200 includes additional secondary link connectors 250, 260 at each end of the link 200. Each of the mount side connector 320 and the component side connector 330 are connected to a corresponding secondary link connector 250, 260 via any known connection.

In some examples the strap portion 340 is a folded, or otherwise compacted, flexible strap. By way of example, the flexible strap could be at least partially constructed of a para-aramid synthetic fiber material such as a KEVLAR®. If the primary link 200 breaks mid-flight, the strap portion 340 unfurls or uncompacts, and the secondary link 300 maintains a connection between the mount 50 and the engine component. In this way, a load of the mounted component is carried by the secondary link 300 when the primary linking structure is in a failed state.

Figure 4B:
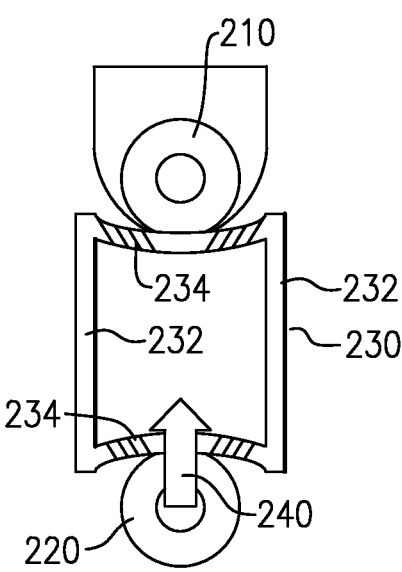
Figure 5:
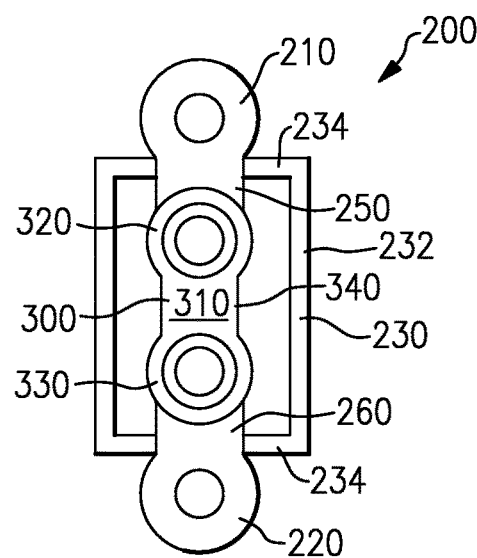
FIG. 5 schematically illustrates the exemplary link of FIG. 3 with an additional secondary link.
Figure 6A:
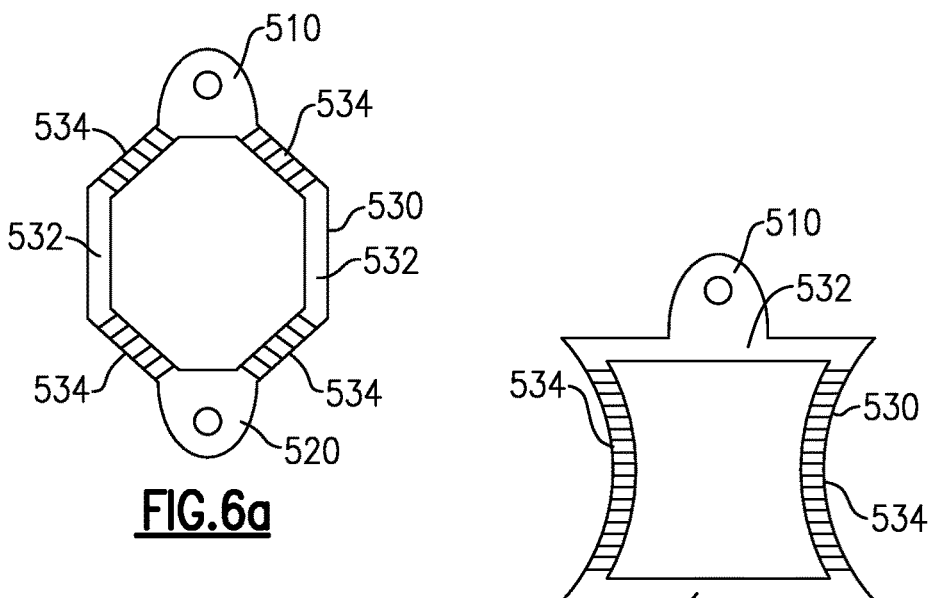
FIG. 6a schematically illustrates a first possible modification to the exemplary link of FIG. 3.
Figure 6B:
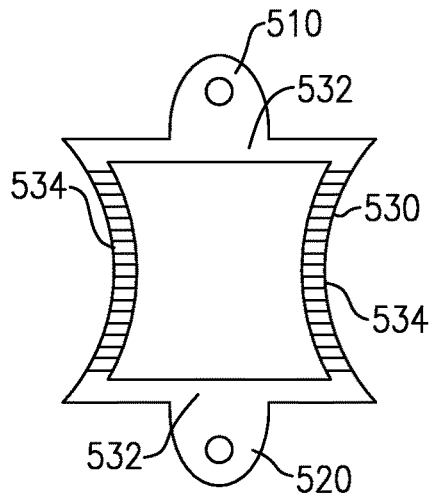
FIG. 6b schematically illustrates a second possible modification to the exemplary link of FIG. 3.
Figure 6C:
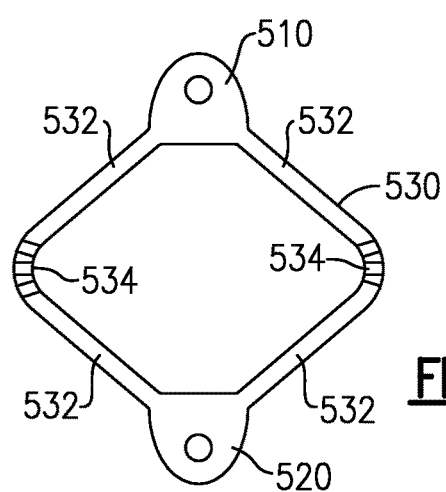
FIG. 6c schematically illustrates a third possible modification to the exemplary link of FIG. 3.
Figure 7:
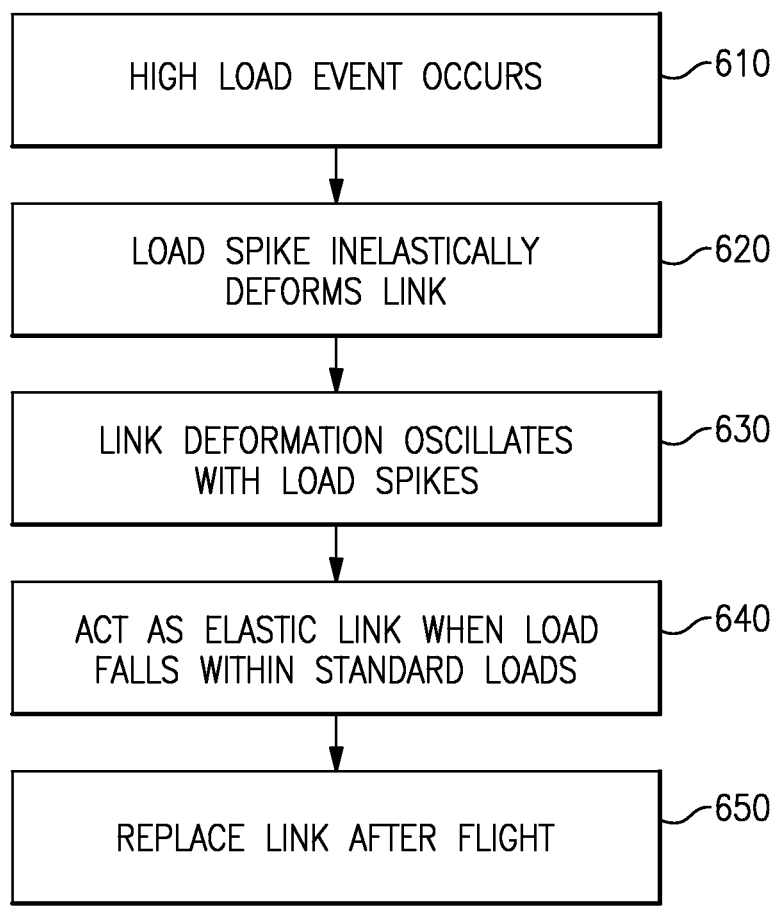
FIG. 7 illustrates a method of preventing transference of high loads to an aircraft wing or body during a high load event.

While illustrated in FIGS. 3-5 as a rectangular body including two rigid portions 232 and two flexing portions 234, one of skill in the art having the benefit of this disclosure will appreciate that the linking structure 230 of the link 200 can take any number of distinct forms, provided those forms include at least one flexing portion configured to inelastically deform when the load is outside of expedited maximum loads during standard operations and remain rigid (elastically deform) when the load is inside of expected maximum loads during standard operations, and at least one elastic portion configured to remain rigid at an expected maximum load, including loads resulting from high load events.

With continued reference to FIG. 3, FIGS. 6a-6c illustrate alternative configurations for the linking structure 230 of the example of FIG. 3. Each of the alternative structures includes a first joint 510 and a second joint 520, with each of the joints 510, 520 being configured to connect with a corresponding mount or component connection according to any known connector style. Connecting the joints 510, 520 are linking structures 530 including elastic portions 532 and flexing portions 534. The elastic portions 532 and the flexing portions 534 of the alternative examples operate in a similar fashion to the elastic portions 232 and the flexing portions 234 of the example of FIG. 3.

Further, one of skill in the art having the benefit of this disclosure will appreciate that any number of distinct linking structures 530 could be utilized provided each linking structure includes at least an elastic portion and a flexing portion, and the flexing portions is configured to inelastically deform under loads in excess of an expected load from standard operations and is configured to remain elastic under expected loads occurring during standard in flight conditions. Moreover, one of skill in the art will readily recognize that the secondary link 300 structure shown in FIG. 5 is equally applicable to each of the embodiments shown in FIGS. 6a-6c; such combinations are fully within the scope of this disclosure.

With continued reference to FIGS. 1-6c, FIG. 7 illustrates a method for utilizing one of the example links 200, 500 to reduce a load increase during a high load event. Initially a high load event occurs at block 610. Immediately after the high load event occurs, the increased load (referred to as a load spike) inelastically deforms the link connecting the aircraft component to the wing or body of the aircraft at block 620. The inelastic deformation of the link absorbs at least a portion of the energy from the high load event, thereby reducing the amount of increased load transferred through the link to the aircraft wing or body.

The inelastic deformation of the link then oscillates with the oscillating peaks and valleys of the load magnification of the high load event at block 630. Once the peaks and valleys of the high load event fall within expected loads from standard in flight maneuvers, the link stops deforming and acts as an elastic link at block 640. Once the aircraft lands, the link exposed to the high load event is replaced at block 650. The replacement link has not experienced any inelastic deformation and has no low cycle fatigue, and is capable of withstanding a complete high load event without breaking.

It is further understood that any of the above described concepts can be used alone or in combination with any or all of the other above described concepts. Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. An aircraft component link comprising:
a link body having a first joint, a second joint, and a linking structure connecting the first joint to the second joint; and
the linking structure including at least two first portions and at least two second portions, the second portions having a greater rigidity than the first portions, wherein each of the at least two first portions is connected to another of the at least two first portions via at least one of the at least two second portions.

2. The aircraft component link of claim 1, wherein the rigidity of each of the at least two first portions is sufficient such that each of the at least two first portions inelastically deforms in response to a load greater than a first threshold and elastically deforms to loads under the first threshold.

3. The aircraft component link of claim 2, wherein the first threshold is at least partially determined by a maximum expected load magnification of aircraft component link oscillation during standard in flight operations of an aircraft.

4. The aircraft component link of claim 1, wherein the rigidity of the at least two first portions is sufficient such that the at least two first portions inelastically deform when exposed to loads greater than a first threshold.

5. The aircraft component link of claim 4, wherein the first threshold is at least partially based on a maximum expected load magnification of aircraft component link oscillation during standard in flight operations of an aircraft.

6. The aircraft component link of claim 4, wherein the at least two first portions have a sufficient rigidity to elastically deform when exposed to loads less than or equal to the first threshold.

7. The aircraft component link of claim 4, wherein the rigidity of the at least two first portions is sufficient such that the at least two first portions withstands inelastic deformation at least a predetermined number of times, and the predetermined number of times is less than an expected number of push-pull cycles during a high load event.

8. The aircraft component link of claim 1 further comprising a secondary linking structure connecting said first joint to said second joint.

9. The aircraft component link of claim 8, wherein a load of a component connected to the aircraft component link is carried by the secondary link when the linking structure is in a failed state.

10. The aircraft component link of claim 9, wherein the secondary link comprises a flexible strap.

11. The aircraft component link of claim 10, wherein the flexible strap is at least partially a para-aramid synthetic fiber.

12. The aircraft component link of claim 1, wherein said first joint is connected to a gas turbine engine, and wherein said second joint is connected to a mount, the mount being connected to one of an aircraft wing and an aircraft body.

13. The aircraft component link of claim 1, wherein each of the at least two first portions is connected to one other of the at least two first portions via each of the at least two second portions.

14. The aircraft component link of claim 1, wherein each of the at least two first portions is connected to each other of the at least two first portions via at least one of the at least two second portions.

15. The aircraft component link of claim 1, wherein each of the first joint and the second joint is directly connected to one of the at least two first portions of the linking structure.

16. The aircraft component link of claim 15, wherein the first joint is directly connected to one of the at least two first portions, and wherein the second joint is directly connected to another of the at least two first portions.

17. A gas turbine engine mount for an aircraft wing comprising:
a link body having a first joint, a second joint and a linking structure connecting the first joint to the second joint; and
the linking structure including at least two flexing portions and at least two inelastic portions, the flexing portions having a sufficient rigidity to flex during a load outside of an expected load window, wherein each of the at least two flexing portions is connected to another of the at least two flexing portions via at least one of the at least two inelastic portions.

18. The gas turbine engine mount of claim 17, wherein the flexing of the at least two flexing portions is an inelastic deformation of the flexing portion of the linking structure.

19. The gas turbine engine mount of claim 17, wherein the at least two flexing portions have sufficient rigidity to elastically deform during a load inside of the expected load window.

20. The gas turbine engine mount of claim 17, wherein the inelastic portion is rigid relative to the flexing portion.

* * * * *